(12) United States Patent
Lam

(10) Patent No.: US 9,566,513 B2
(45) Date of Patent: Feb. 14, 2017

(54) MULTIPLAYER TEAM BALANCING

(71) Applicant: Anthony Lam, Hong Kong (CN)

(72) Inventor: Anthony Lam, Hong Kong (CN)

(*) Notice: Subject to any disclaimer, the term of this patent is extended or adjusted under 35 U.S.C. 154(b) by 74 days.

(21) Appl. No.: 14/217,438

(22) Filed: Mar. 17, 2014

(65) Prior Publication Data

US 2014/0302924 A1    Oct. 9, 2014

Related U.S. Application Data

(60) Provisional application No. 61/802,405, filed on Mar. 16, 2013.

(51) Int. Cl.
| | |
|---|---|
| G06F 17/00 | (2006.01) |
| A63F 13/30 | (2014.01) |
| A63F 13/795 | (2014.01) |
| A63F 13/75 | (2014.01) |
| A63F 13/798 | (2014.01) |

(52) U.S. Cl.
CPC ............... *A63F 13/30* (2014.09); *A63F 13/75* (2014.09); *A63F 13/795* (2014.09); *A63F 13/798* (2014.09)

(58) Field of Classification Search
CPC ........ A63F 13/30; A63F 13/795; A63F 13/75; A63F 13/798
See application file for complete search history.

(56) References Cited

U.S. PATENT DOCUMENTS

| | | | | |
|---|---|---|---|---|
| 2009/0121438 | A1* | 5/2009 | Gustafsson | 273/303 |
| 2011/0082571 | A1* | 4/2011 | Murdock et al. | 700/92 |
| 2011/0172018 | A1* | 7/2011 | Premutico | 463/42 |
| 2014/0024462 | A1* | 1/2014 | Qiang et al. | 463/42 |
| 2014/0370992 | A1* | 12/2014 | Cudak et al. | 463/43 |

OTHER PUBLICATIONS

Aesmis. We need a system to replace AFK teammates. Forums.na.leagueoflegends.com. Online. May 23, 2012. Accessed via the Internet. Accessed Aug. 18, 2015. <URL: http://forums.na.leagueoflegends.com/board/showthread.php?t=2145240>.*

League of Legends. Wikipedia.org. Online. Accessed via the Internet. Accessed Aug. 18, 2015. <URL: https://en.wikipedia.org/wiki/League_of_Legends>.*

* cited by examiner

*Primary Examiner* — Dmitry Suhol
*Assistant Examiner* — Carl V Larsen
(74) *Attorney, Agent, or Firm* — Lam Patents Limited; Johnny Lam

(57) ABSTRACT

Techniques are disclosed for multiplayer team balancing in a virtual environment. A group activity is provided in which at least two teams of avatars participate. Each team has a respective plurality of distinct avatars, and each avatar is controlled by a respective player. The at least teams are in competition with one another to achieve a predefined objective when participating in the group activity. Upon it being determined, when the group activity is in progress, that a first player of a first avatar on a first team of the at least two teams is no longer available to participate in the group activity, a balancing action is performed in order to compensate for the first player no longer being available to participate in the group activity.

20 Claims, 5 Drawing Sheets

MULTIPLAYER TEAM BALANCING

CROSS-REFERENCE TO RELATED APPLICATIONS

This application claims benefit of U.S. provisional patent application Ser. No. 61/802,405, filed on Mar. 16, 2013. The aforementioned provisional patent application is herein incorporated by reference in its entirety.

BACKGROUND

In-home computer games and computer game systems have become mainstream consumer products. Such systems allow a user to play computer games at home on a standard television set or on a handheld device that the user may carry with the user. Typically, in-home computer game systems include a console that reads computer game code from a storage device (e.g., a CD-ROM disc or cartridge) and transmits video to a television screen for display. Computer game systems also typically include a controller device that allows the user playing the computer game to provide inputs to the computer game to manipulate the characters or other features of the game.

Generally, the designer of the computer game will create a computer-rendered world in which the computer game characters or other features may interact. For example, many computer games allow a player to maneuver an avatar (e.g., a sprite or character) through a computer-rendered world to accomplish a set of tasks. Other computer games allow the player to control a vehicle or airplane through a computer-rendered world. In two-dimensional computer games, characters may move in two dimensions (e.g., up and down on the screen or left and right), while in three-dimensional computer games, characters are typically allowed to move in three dimensions in the computer-rendered world.

SUMMARY

Embodiments presented in this disclosure provide a computer-implemented method of multiplayer team balancing in a virtual environment. The method includes providing a group activity in which at least two teams of avatars participate. Each team has a respective plurality of distinct avatars, and each avatar is controlled by a respective player. At least two teams are in competition with one another to achieve a predefined objective when participating in the group activity. Each avatar is selected from a set of available avatars, and each available avatar has a distinct name and a distinct gameplay aspect relative to other available avatars. Each team has at most one of each available avatar. The method also includes, upon determining, when the group activity is in progress, that a first player of a first avatar on a first team of the at least two teams is no longer available to participate in the group activity, performing a balancing action in order to compensate for the first player no longer being available to participate in the group activity.

Other embodiments presented in this disclosure provide a computer-readable medium for of multiplayer team balancing in a virtual environment and containing a program which, when executed, performs an operation that includes providing a group activity in which at least two teams of avatars participate. Each team has a respective plurality of distinct avatars, and each avatar is controlled by a respective player. At least two teams are in competition with one another to achieve a predefined objective when participating in the group activity. Each avatar is selected from a set of available avatars, and each available avatar has a distinct name and a distinct gameplay aspect relative to other available avatars. Each team has at most one of each available avatar. The operation also includes, upon determining, when the group activity is in progress, that a first player of a first avatar on a first team of the at least two teams is no longer available to participate in the group activity, performing a balancing action in order to compensate for the first player no longer being available to participate in the group activity.

Still other embodiments presented in this disclosure provide a system for of multiplayer team balancing in a virtual environment. The system includes one or more computer processors and a memory containing a program which, when executed by the one or more computer processors, is configured to perform an operation that includes providing a group activity in which at least two teams of avatars participate. Each team has a respective plurality of distinct avatars, and each avatar is controlled by a respective player. At least two teams are in competition with one another to achieve a predefined objective when participating in the group activity. Each avatar is selected from a set of available avatars, and each available avatar has a distinct name and a distinct gameplay aspect relative to other available avatars. Each team has at most one of each available avatar. The operation also includes, upon determining, when the group activity is in progress, that a first player of a first avatar on a first team of the at least two teams is no longer available to participate in the group activity, performing a balancing action in order to compensate for the first player no longer being available to participate in the group activity.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

So that the manner in which the above recited features, advantages and objects of embodiments presented in this disclosure are attained and can be understood in detail, a more particular description of the embodiments, briefly summarized above, may be had by reference to the embodiments thereof which are illustrated in the appended drawings.

It is to be noted, however, that the appended drawings illustrate only typical embodiments disclosed herein and are therefore not to be considered limiting of its scope, for the disclosure may admit to other equally effective embodiments.

Figure 1:
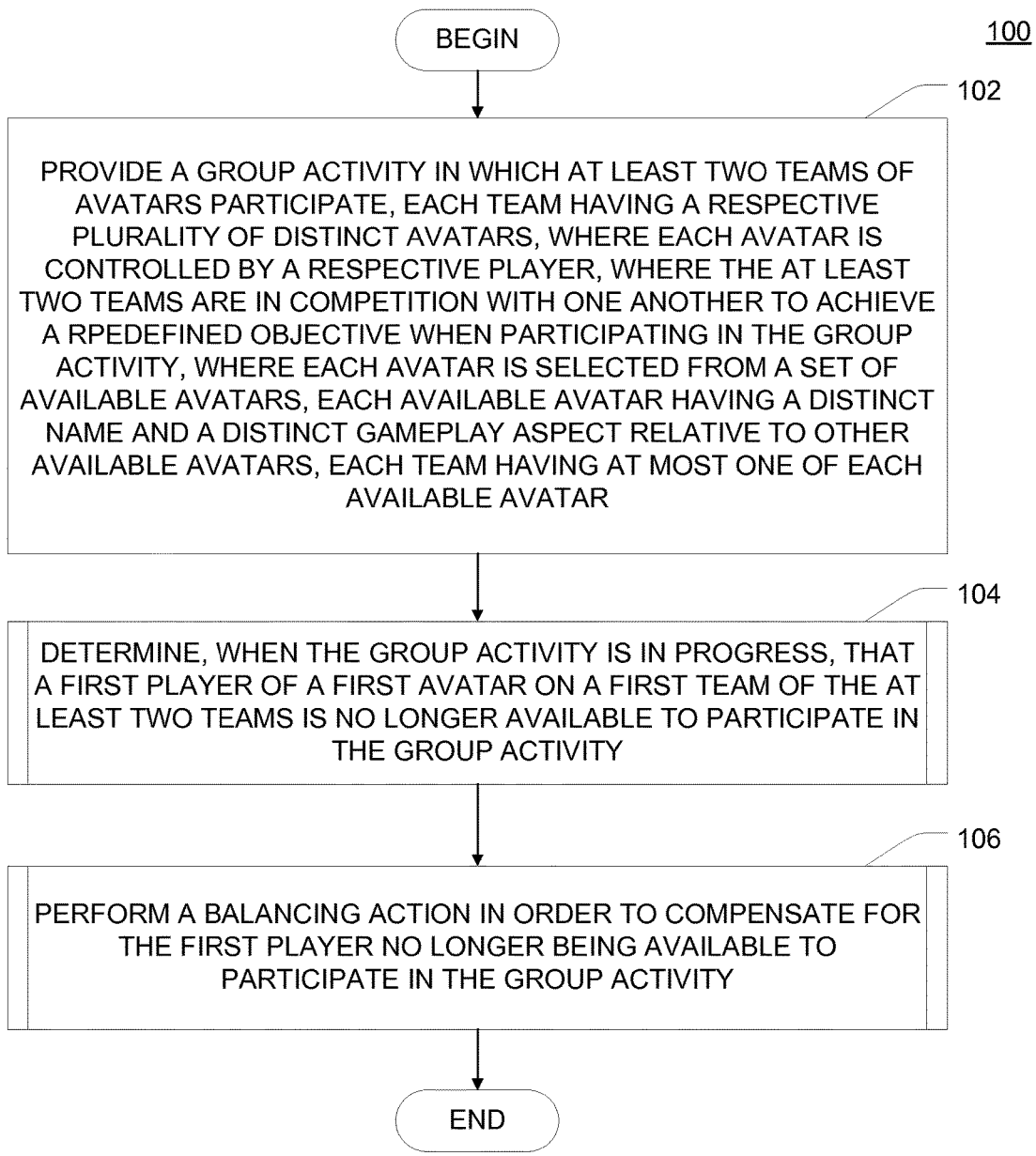

FIG. 1 is a flowchart depicting a method for multiplayer team balancing in a virtual environment, according to one embodiment presented in this disclosure.

Figure 2:
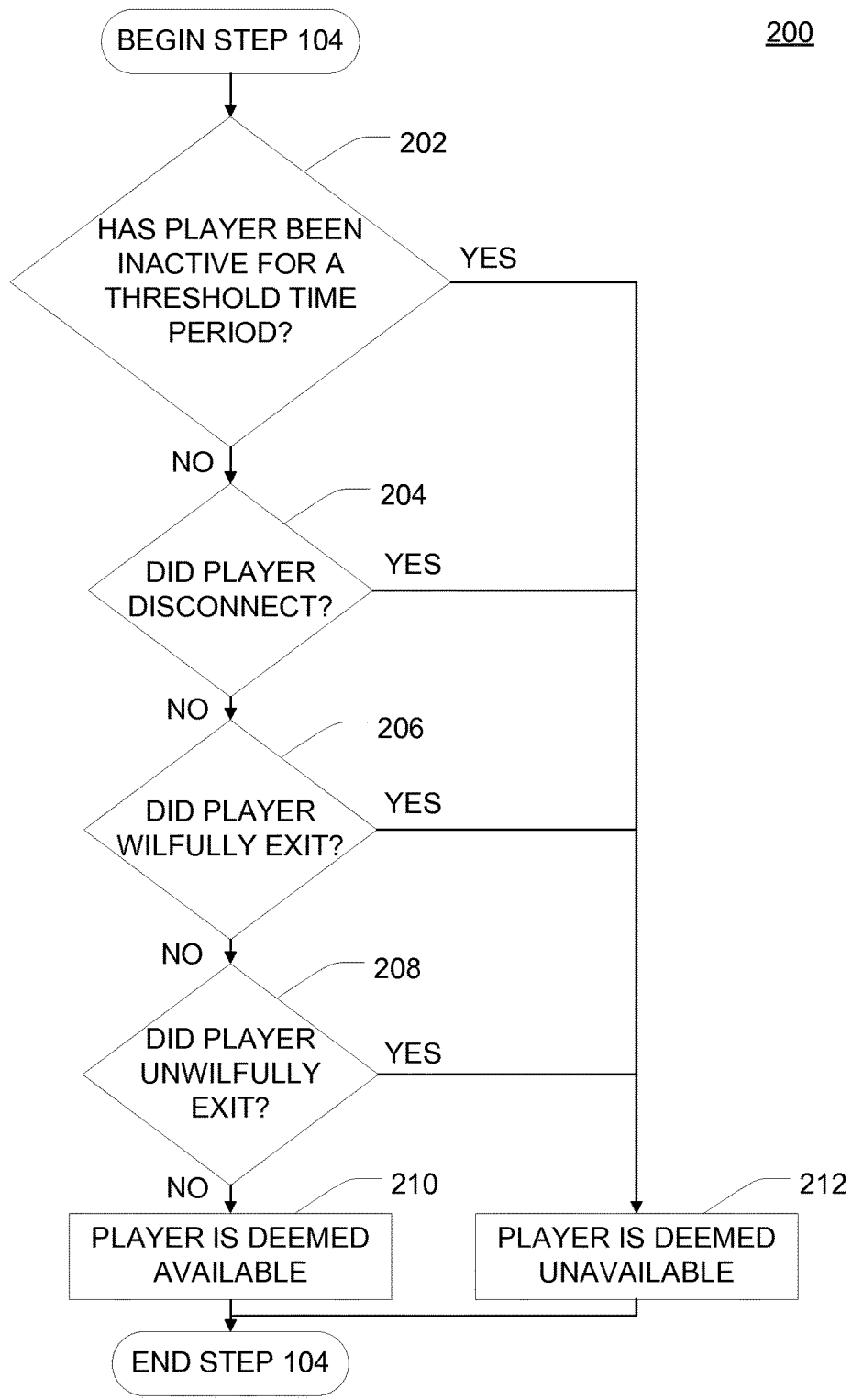

FIG. 2 is a flowchart depicting a method to determine that a player is unavailable during a group activity, according to one embodiment presented in this disclosure.

Figure 3:
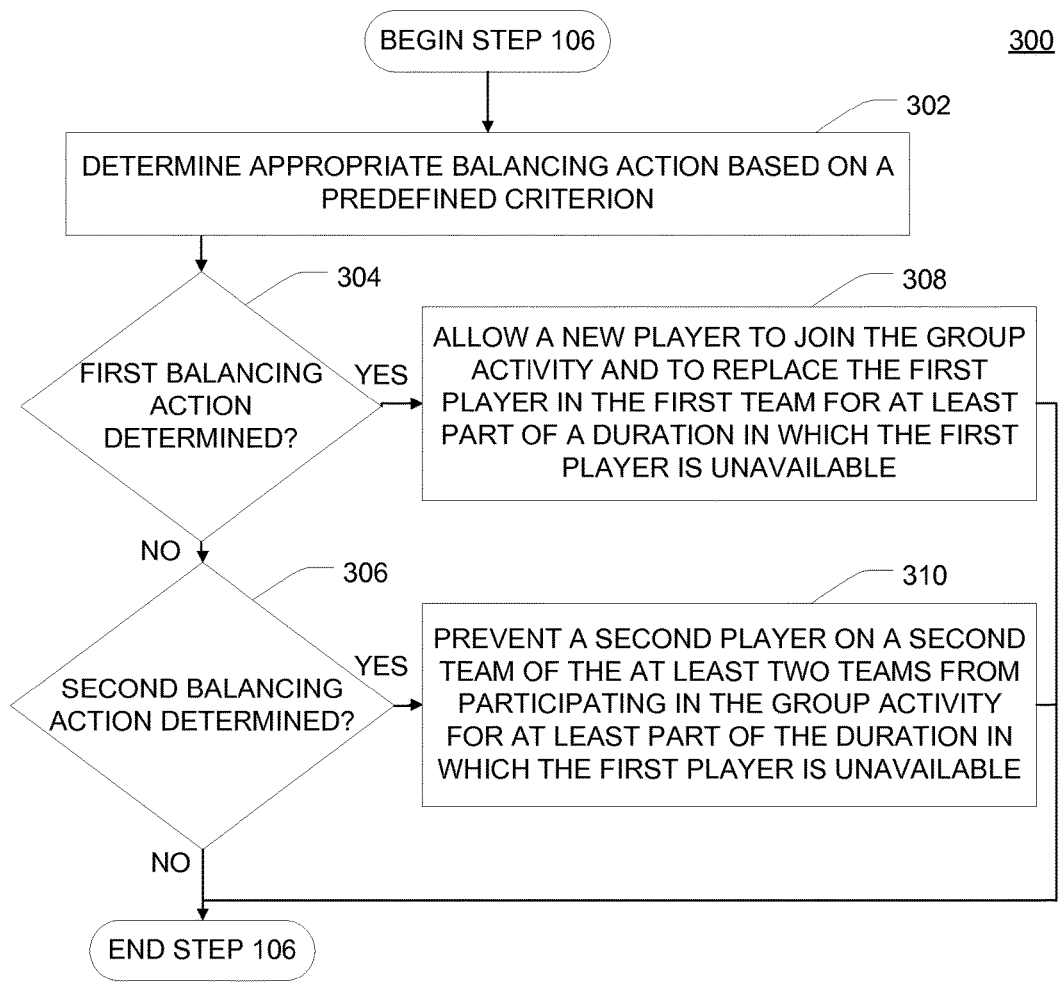

FIG. 3 is a flowchart depicting a method to perform a balancing action in order to compensate for a player no longer being available to participate in the group activity, according to one embodiment presented in this disclosure.

Figure 4:
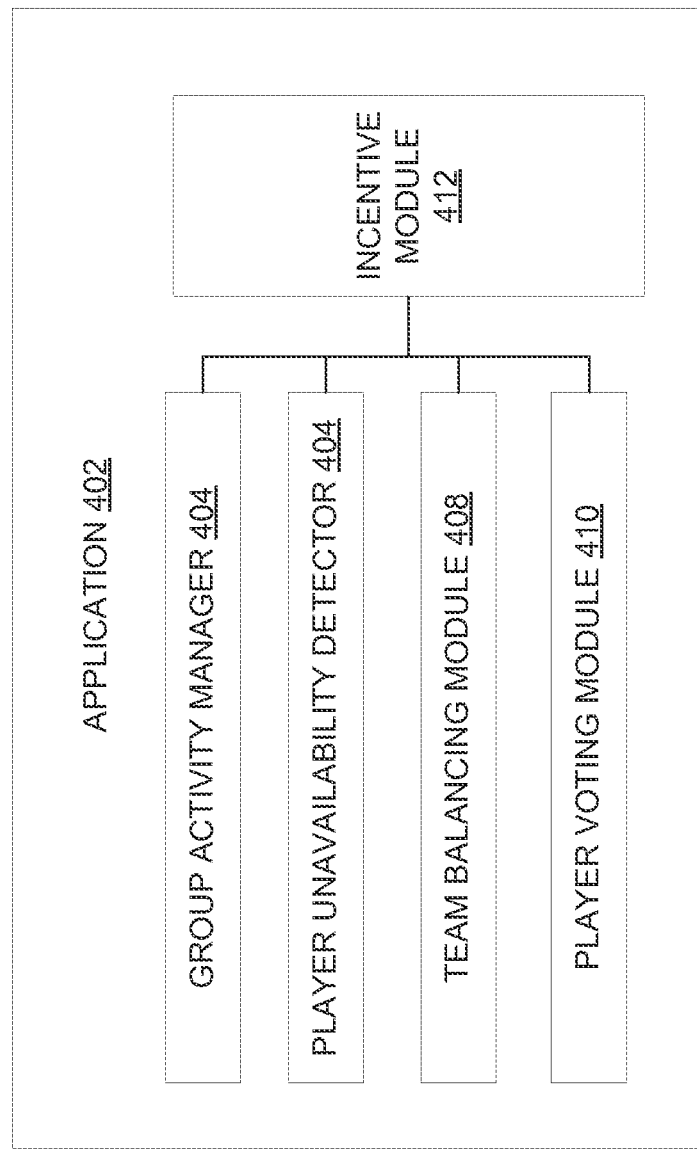

FIG. 4 is a block diagram illustrating components of an application configured to perform a team balancing operation, according to one embodiment presented in this disclosure.

Figure 5:
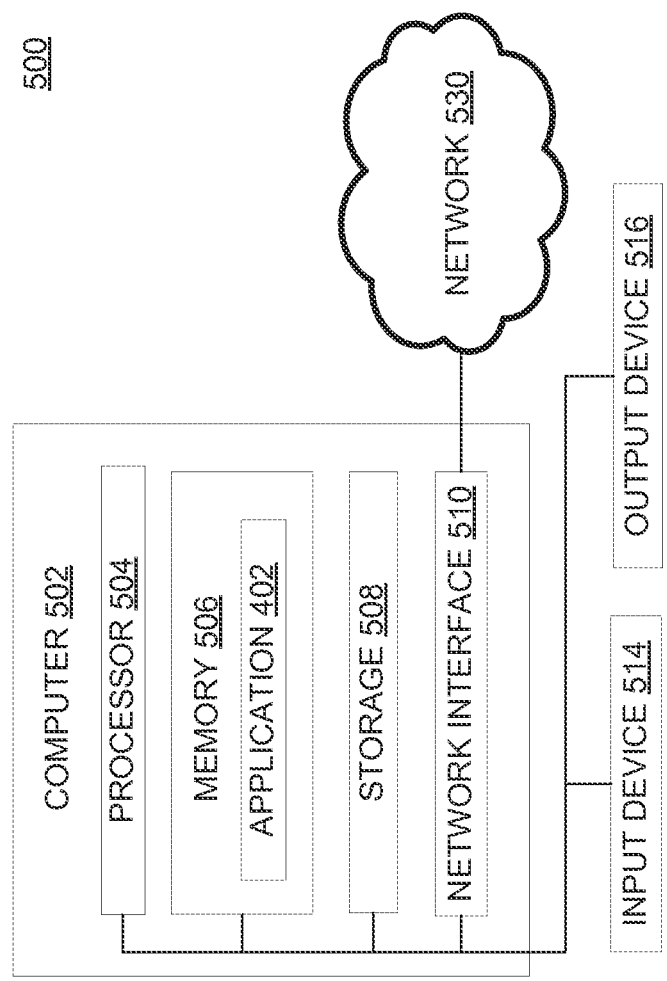

FIG. 5 is a block diagram illustrating a networked system for multiplayer team balancing, according to one embodiment presented in this disclosure.

DETAILED DESCRIPTION

Embodiments presented in this disclosure generally facilitate multiplayer team balancing in virtual environments.

FIG. 1 is a flowchart depicting a method 100 for multiplayer team balancing in a virtual environment, according to one embodiment presented in this disclosure. One embodiment provides an application configured to facilitate multiplayer team balancing in the virtual environment. As shown, the method 100 begins at the step 102, where the application provides a group activity in which at least two teams of avatars participate. Each team may have a respective plurality of distinct avatars, and each avatar may be controlled by a respective player. At least two times are in competition with one another to achieve a predefined objective when participating in the group activity. Each avatar is selected from a set of available avatars, and each available avatar has a distinct name and a distinct gameplay aspect relative to other available avatars. In some embodiments, each team has at most one of each available avatar. Put another way, in such embodiments, a given team is not allowed to have multiple players using the same avatar. At least in some embodiment, the distinct gameplay aspect refers to an aspect affecting gameplay and that extends beyond mere visual or cosmetic distinction relative to other avatars. An example of a gameplay aspect is a unique skill, spell, trait, attribute, strength, or weakness of an avatar. At step 104, the application determines, when the group activity is in progress, that a first player of a first avatar on a first team of the at least two teams is no longer available to participate in the group activity. The step 104 is further described below in conjunction with FIG. 2. At step 106, the application performs a balancing operation in order to compensate for the first player no longer being available to participate in the group activity. The balancing operation is also referred to herein as a balancing action. Further, the step 104 is further described below in conjunction with FIG. 3. After the step 106, the method 100 terminates.

FIG. 2 is a flowchart depicting a method 200 to determine that a player is unavailable during a group activity, according to one embodiment presented in this disclosure. The method 200 corresponds to the step 104 of FIG. 1. As shown, the method 200 begins at step 202, where the application determines whether the player has been inactive for a threshold time period. If not, the application determines whether the player has disconnected (step 204). If not, the application determines whether the player has willfully exited the group activity, the virtual environment, or the computer game providing the virtual environment (step 206). For instance, the application may determine whether the player has submitted an explicit request, recognized by the application, to exit the group activity. In some embodiments, the application may also determine whether the player has operating system command to forcibly terminate the application. If the player is not determined to have willfully exited the group activity, the application determines whether the player has un-willfully exited (step 208). If not, the application determines that the player is available (step 210). On the other hand, if any of the steps 202, 204, 206, 208 are answered in the affirmative, then the application determines that the player is unavailable (step 212). After the step 210 or 212, the method 200 terminates.

FIG. 3 is a flowchart depicting a method 300 to perform a balancing action in order to compensate for a player no longer being available to participate in the group activity, according to one embodiment presented in this disclosure. The method 300 corresponds to the step 106 of FIG. 1. As shown, the method 300 begins at step 302, where the application determines an appropriate balancing action based on a predefined criterion such as user preferences, user voting, virtual environment administrator settings, etc. If a first balancing action is determined (step 304), the application allows a new player to join the group activity and to replace the first player in the first team for at least part of a duration in which the first player is unavailable (step 308). On the other hand, if a second balancing action is determined (step 306), the application prevents a second player on a second team of the at least two teams from participating in the group activity for at least part of the duration in which the first player is unavailable (step 310). After the step 308 or the step 310, or if no balancing action is determined, the method 300 terminates. The number and types of balancing actions may be tailored to suit the needs of a particular case.

FIG. 4 is a block diagram illustrating components of an application 402 configured to perform a team balancing operation, according to one embodiment presented in this disclosure. Depending on the embodiment, the application 402 may be a virtual world client application or a virtual world server application. As shown, the application 402 includes a group activity manager 404, a player unavailability detector 406, a team balancing module 408, a player voting module 410, and an incentive module 412. In one embodiment, the group activity manager 404 is configured to initiate, manage, and end group activities occurring in the virtual environment. The player unavailability detector 406 is configured to detect unavailability of a player when a group activity is taking place in the virtual environment.

In one embodiment, the team balancing module 408 is configured to perform a balancing operation in response to the detected unavailability of the player and according to the techniques disclosed herein. In one embodiment, the team balancing module 408 also grants the new player with avatar aspects selected from avatar currency, avatar experience, avatar items, and avatar skill point distributions, that at least partially correspond to the respective avatar aspect of the first player when the first player is first determined to be inactive. In some embodiments, such avatar aspects may be determined based on other players in the group activity, including team members of the unavailable player and/or opposing team members—in conjunction with or to the exclusion of the unavailable player. For instance, when joining the game as a substitute for the unavailable player, the new player may receive an additional amount of avatar currency determined based on a function of the current avatar currencies of the team members of the unavailable player, where the function is an average or other statistical measure. The player voting module 410 is configured to allow voting player of the teams participating in the group activity to control whether new players may join in place of an unavailable player and what avatars the new players may be allowed to select upon joining For example, in one embodiment, a respective threshold number of votes must be reached within the team of the unavailable player in order to decide each of: (i) whether to wait for the unavailable player to rejoin; (ii) whether to replace the unavailable player with a new player; and (iii) whether to allow the new player to join with a different avatar rather than having the new player use the same avatar as the first player. Each threshold may be distinct in some embodiments. Further, in one embodiment, the new player is only allowed to join with a different avatar if each opposing team also reaches a threshold number of votes in favor of doing so.

In one embodiment, the incentive module 412 is configured to reward a new player for making himself or herself available to contribute to balanced gameplay as the subject of the balancing operation, upon the group activity ending. In one embodiment, each module has a respective module name uniquely identifying the respective module relative to other modules, and each module contains a respective, distinct set of source code of the application 402. In some embodiments, the incentive module 412 may also provide disincentives to players who are suspected of purposefully exit group activities prematurely in order to ruin the experience of other players. For example, in some embodiments, the incentive module 412 may penalize players who exhibit a pattern of premature leaving by only allowing such players to join already commenced group activities as part of balancing operations, as a form of rehabilitation of such players. Only upon successful completion of such group activities are such players once again allowed to join group activities that are to newly commence. The number and types of modules 408 may be tailored to suit the needs of a particular case.

Examples of incentives include, but are not limited to, experience points and associated bonuses thereof, virtual currency and associated bonuses thereof, real currency and associated bonuses thereof, etc. Additionally or alternatively, player titles may be granted to players, based on the extent to which players participate in facilitating multiplayer team balancing, which players may choose to display in-game and/or outside of the game (e.g., on a player profile on a website for the game). For instance, titles such as "Savior", "Good Samaritan" may be granted to the player. In some embodiments, titles may also have associated tiers or levels: for example, titles of "Novice Balancer", "Master Balancer", and "Legendary Balancer" may be awarded, in recognition of successively greater achievement in terms of involvement in multiplayer team balancing. Achievement may be measured in terms of number of substitute games completed, minutes played therein, etc.

In some embodiments, when presenting, to a new player, an option to join a group activity in progress and thereby replace an unavailable player, the application presents the new player with information pertaining to the group activity in progress and/or the team that the new player may join. Doing so allows the new player to make a more informed decision of whether to join a particular group activity in progress. For instance, the information pertaining to the group activity in progress may include a group activity name or type, map name or type, group activity modes or options, elapsed duration of the group activity, etc. The information pertaining to the team may include player names and roles, player attributes such as player skill levels or player friendliness measures, etc. At least in some embodiments, the information presented to the new player is exactly the information, neither more nor less, than that provided to the other players of the group activity at or prior to the time of commencement of the group activity. In alternative embodiments, however the new player may be provided with additional information or a reduced amount of information.

Assume that after the new player opts to join the group activity in progress and thereby replace the now-unavailable first player. Assume further that the first player subsequently indicates a desire to re-join the group activity in progress. In some embodiments, the application precludes the first player from successfully re-joining the group activity in progress. Alternatively, the application may reduce or eliminate a penalty applied to the first player, should the application determine that the indication of first player to re-join the group activity in progress is in earnest, such as based on historical behavior of the user as reflected in one or more activity logs maintained for the first player. For instance, the application may predict, based on historical behavior of the player, whether the player is intending to re-join only to intentionally further undermine multiplayer team balancing by leave the group activity once again. In still other embodiments, the application permits the first player to re-join the group activity in progress and prematurely removes the new player from the group activity in progress. In such instances, the new player may nevertheless be rewarded the full reward as though the new player had completed the group activity. The reward may also be increased to compensate the new player for the inconvenience or undesirability of being precluded from successfully completing the group activity. Further, in some embodiments, one or more team members of the new player are permitted to vote in order to decide whether to allow the first player to rejoin the group activity and thereby replace the new player, based on a vote that exceeds a predefined threshold of votes. Depending on the embodiment, this predefined threshold of votes may be the same as or different from the other thresholds described above.

FIG. 5 is a block diagram illustrating a networked system 500 for multiplayer team balancing, according to one embodiment presented in this disclosure. The networked system 500 includes a computer 502. The computer 502 may also be connected to other computers via a network 530. In general, the network 530 may be a telecommunications network and/or a wide area network (WAN). In a particular embodiment, the network 530 is the Internet.

The computer 502 generally includes a processor 504 connected via a bus 512 to a memory 506, a network interface device 510, a storage 508, an input device 514, and an output device 516. The computer 502 is generally under the control of an operating system. Examples of operating systems include UNIX, versions of the Microsoft Windows® operating system, and distributions of the Linux® operating system. More generally, any operating system supporting the functions disclosed herein may be used. The processor 504 is included to be representative of a single CPU, multiple CPUs, a single CPU having multiple processing cores, and the like. Similarly, the memory 406 may be a random access memory. While the memory 506 is shown as a single entity, it should be understood that the memory 506 may comprise a plurality of modules, and that the memory 506 may exist at multiple levels, from high speed registers and caches to lower speed but larger DRAM chips. The network interface device 510 may be any type of network communications device allowing the computer 502 to communicate with other computers via the network 530.

The storage 508 may be a persistent storage device. Although the storage 508 is shown as a single unit, the storage 508 may be a combination of fixed and/or removable storage devices, such as fixed disc drives, solid state drives, floppy disc drives, tape drives, removable memory cards or optical storage. The memory 506 and the storage 508 may be part of one virtual address space spanning multiple primary and secondary storage devices.

The input device 514 may be any device for providing input to the computer 502. For example, a keyboard and/or a mouse may be used. The output device 516 may be any device for providing output to a user of the computer 502. For example, the output device 516 may be any conventional display screen or set of speakers. Although shown separately from the input device 514, the output device 516 and input device 514 may be combined. For example, a display screen with an integrated touch-screen may be used.

As shown, the memory 506 of the computer 502 includes the application 402. In one embodiment, the application 102 is configured to perform a balancing operation based on the techniques disclosed herein. Doing so may improve user satisfaction with group activities in the virtual environment at least in some cases.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects presented in this disclosure may be embodied as a system, method or computer program product. Accordingly, aspects disclosed herein may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects disclosed herein may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this disclosure, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects disclosed herein may be written in any combination of one or more programming languages, including an object oriented programming language such as Java, Smalltalk, C++ or the like and conventional procedural programming languages, such as the "C" programming language or similar programming languages. The program code may execute entirely on the computer of a user, partly on the computer of the user, as a stand-alone software package, partly on the computer of the user and partly on a remote computer, or entirely on the remote computer or server. In the latter scenario, the remote computer may be connected to the computer of the user via any type of network, including a local area network (LAN) or a wide area network (WAN), or the connection may be made to an external computer (for example, through the Internet using an Internet Service Provider).

Aspects presented in this disclosure are described above with reference to flowchart illustrations or block diagrams of methods, apparatus (systems) and computer program products according to embodiments disclosed herein. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart or block diagram block or blocks.

Embodiments disclosed herein may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the embodiments presented herein, a user of the application 402 may submit a vote via a client application to a server application, in support of a balancing operation to be performed in order to replace an unavailable teammate with a new player. Thus, the user may enjoy benefits of the balancing operation from any computing system attached to a network connected to the cloud (e.g., the Internet) and be charged based on the processing environment(s) used.

The flowchart and block diagrams in the Figures illustrate the architecture, functionality, and operation of possible implementations of systems, methods and computer program products according to various embodiments disclosed herein. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams or flowchart illustration, and combinations of blocks in the block diagrams or flowchart illustration, can be implemented by special-purpose hardware-based systems that perform the specified functions or acts, or combinations of special purpose hardware and computer instructions.

While the foregoing is directed to embodiments presented in this disclosure, other and further embodiments may be devised without departing from the basic scope of contemplated embodiments, and the scope thereof is determined by the claims that follow.

What is claimed is:

1. A computer-implemented method of using balancing actions to mitigate disruption of networked group activities as a result of participant inactivity, the computer-implemented method comprising:
    programmatically conducting a plurality of networked group activities in a virtual environment of a computer game, based on input received from a plurality of participants via a computer network, wherein each networked group activity includes two teams of avatars controlled based on the input, each team having a respective plurality of distinct avatars, each avatar of which is controlled by a respective participant of the plurality of participants, wherein the at least two teams are in competition with one another to achieve a predefined objective when participating in the respective networked group activity, wherein each avatar is selected from a set of available avatars, each available avatar having a distinct name and a distinct gameplay aspect relative to other available avatars;
    upon determining, during a first of the plurality of networked group activities, that the avatar of a first of the plurality of participants is inactive in the first networked group activity as characterized by absence of gameplay input received from the first participant for at least a threshold period of time while the avatar of the first participant remains present in the first networked group activity, performing a first balancing action including replacing the first participant with a new participant, outside of the plurality of participants, in the first networked group activity for at least part of a duration in which the avatar of the first participant is inactive;
    upon determining, during a second of the plurality of networked group activities, that the avatar of a second of the plurality of participants is inactive in the second networked group activity, performing, by operation of one or more computer processors, a second balancing action including prohibiting activity of the avatar of a third participant of the plurality of participants and on an opposing team relative to the second participant, in the second networked group activity for at least part of a duration in which the avatar of the second participant is inactive; and
    subsequent to completion of at least one of the first and second networked group activities, awarding an incentive via the computer network and to at least one of the new participant and the third participant for facilitating balance in the computer game.

2. The computer-implemented method of claim 1, wherein the first and second balancing actions are performed by an application operatively connected to the computer network, wherein the application is configured to, in respective instances, perform a respective balancing action responsive to determining that the first participant is no longer available to participate in the first networked group activity upon each individual condition selected from:
    (i) the avatar of the first participant being inactive;
    (ii) the first participant disconnecting from the first networked group activity;
    (iii) the first participant exiting the virtual environment as a result of an explicit request of the first participant to exit the virtual environment; and
    (iv) the first participant exiting the virtual environment not as a result of any explicit request of the first participant to exit the virtual environment.

3. The computer-implemented method of claim 2, wherein the new participant is added upon receiving, from the new participant, confirmation of a desire to join an already commenced, networked group activity and to use a first avatar of the first participant, wherein the new participant is precluded from participating in the first networked group activity using any avatar other than the first avatar previously used by the first participant, in order to further facilitate balance;
    wherein the first and second balancing actions are performed without restarting the first and second networked group activities and in order to mitigate disruption of the first and second networked group activities due to inactivity of the first and second participants, wherein each team has at most one of each available avatar, wherein the first balancing action further includes assigning the new participant an inherited gameplay measure via the computer network, the inherited gameplay measure comprising at least part of an avatar-specific gameplay measure accrued during the first networked group activity by one or more participants of a team of the first participant.

4. The computer-implemented method of claim 3, wherein the application is configured to, in respective instances, provide the new participant with each individual avatar-specific gameplay measure selected from: avatar currency, avatar experience, avatar items, and avatar skill point distribution, to at least partially correspond to the respective avatar-specific gameplay measure of the first participant when the first participant is first determined to have become unavailable; wherein the application is further configured to provide a predefined period of time in which the application adjusts each avatar-specific gameplay measure based on input from the new participant and without penalty to the new participant in terms of the first networked group activity, wherein the computer-implemented method further comprises:

upon determining that a given participant, selected from the first and second participants, has surpassed a threshold number of times of becoming unavailable during networked group activities, assigning an eligibility restriction as a penalty to the given participant via the computer network, the eligibility restriction precluding the given participant from participating in one or more subsequent networked group activities except as a replacement participant for one or more subsequent balancing actions, wherein the eligibility restriction is removed only upon completion of a predefined count of networked group activities in which the one or more subsequent balancing actions occur.

5. The computer-implemented method of claim 4, wherein subsequent to completion of the first networked group activity, the new participant is awarded a first incentive via the computer network for facilitating balance in the computer game, wherein subsequent to completion of the second networked group activity, the third participant is awarded a second incentive via the computer network for facilitating balance in the computer game, wherein the incentive comprises at least one of the first and second incentives, wherein the incentive comprises at least one of virtual currency and real currency, wherein the virtual currency is a different type of currency than the avatar currency, wherein the at least part of the avatar-specific gameplay measure is less than all of the avatar-specific gameplay measure;

wherein the incentive further comprises a first participant title explicitly characterizing the at least one participant as being a facilitator of balance in the computer game, wherein the first player title is selected from a plurality of participant titles corresponding to successively greater characterizations of being a facilitator of balance in the computer game, wherein the first participant title is selected based on a measure of contribution of the at least one participant to balance in the computer game;

wherein the penalty further includes a second participant title explicitly characterizing the given participant as being detrimental to balance in the computer game.

6. The computer-implemented method of claim 5, wherein the first and second balancing actions are distinct, wherein the first, second, and third participants are distinct participants, wherein the application is configured to programmatically search for new participants to invite to join the first networked group activity in place of the first participant only upon approval of the predefined number of other participants on a first team of the first participant, thereby permitting the first team control of whether to replace the first participant and whether to wait for the first participant to rejoin the first networked group activity, wherein each participant comprises a human participant, wherein the incentive consists of a predefined amount of virtual currency usable in the computer game;

wherein the application has a plurality of components including a group activity manager, a participant availability detector, a team balancing module, and an incentive module, wherein each of the first and second networked group activities is programmatically conducted by the group activity manager, wherein that the first and second participants have respectively become unavailable is determined by the participant availability detector, wherein the first and second balancing actions are respectively performed by the team balancing module, wherein the incentive is awarded by the incentive module, wherein the application is configured to, in respective instances:

(i) only assign, to the new participant, the at least part of the avatar-specific gameplay measure accrued by the first participant during the first networked group activity, wherein the avatar-specific gameplay measure comprises a first gameplay measure;

(ii) only assign, to the new participant, at least part of a second gameplay measure accrued by the same team as the first participant; and (iii) only assign, to the new participant, at least part of a third gameplay measure accrued by at least one participant, other than the first participant, on the same team as the first participant.

7. The computer-implemented method of claim 1, wherein the first balancing action further includes assigning the new participant an inherited gameplay measure via the computer network.

8. The computer-implemented method of claim 1, further comprising:

upon determining that a given participant, selected from the first and second participants, has exhibited a pattern of becoming unavailable during networked group activities, assigning, as a penalty to the given participant via the computer network, an eligibility restriction on one or more subsequent networked group activities.

9. The computer-implemented method of claim 1, wherein at least one of the first, second, third, and new participants is assigned a participant title explicitly characterizing a measure of at least one participant as being a facilitator or hinderer of balance in the computer game.

10. The computer-implemented method of claim 1, further comprising:

upon determining that a given participant, selected from the first and second participants, has surpassed a threshold number of times of becoming unavailable during networked group activities, assigning, as a penalty to the given participant via the computer network, an eligibility restriction on one or more subsequent networked group activities, wherein the eligibility restriction is removed only upon completion of a predefined count of the one or more subsequent networked group activities.

11. A non-transitory computer-readable medium to use balancing actions to mitigate disruption of networked group activities as a result of participant inactivity, the non-transitory computer-readable medium containing an application which, when executed, performs an operation comprising:

programmatically conducting a plurality of networked group activities in a virtual environment of a computer game, based on input received from a plurality of participants via a computer network, wherein each networked group activity includes two teams of avatars controlled based on the input, each team having a respective plurality of distinct avatars, each avatar of which is controlled by a respective participant of the plurality of participants, wherein the at least two teams are in competition with one another to achieve a predefined objective when participating in the respective networked group activity, wherein each avatar is selected from a set of available avatars, each available avatar having a distinct name and a distinct gameplay aspect relative to other available avatars;

upon determining, during a first of the plurality of networked group activities, that the avatar of a first of the plurality of participants is inactive in the first networked group activity as characterized by absence of gameplay input received from the first participant for at least a threshold period of time while the avatar of the first participant remains present in the first networked group activity, performing a first balancing action including replacing the first participant with a new participant, outside of the plurality of participants, in the first networked group activity for at least part of a duration in which the avatar of the first participant is inactive;

upon determining, during a second of the plurality of networked group activities, that the avatar of a second of the plurality of participants is inactive in the second networked group activity, performing, by operation of one or more computer processors when executing the application, a second balancing action including prohibiting activity of the avatar of a third participant of the plurality of participants and on an opposing team relative to the second participant, in the second networked group activity for at least part of a duration in which the avatar of the second participant is inactive; and subsequent to completion of at least one of the first and second networked group activities, awarding an incentive via the computer network and to at least one of the new participant and the third participant for facilitating balance in the computer game.

12. The non-transitory computer-readable medium of claim 11, wherein the first balancing action further includes assigning the new participant an inherited gameplay measure via the computer network.

13. The non-transitory computer-readable medium of claim 11, wherein the operation further comprises:

upon determining that a given participant, selected from the first and second participants, has exhibited a pattern of becoming unavailable during networked group activities, assigning, as a penalty to the given participant via the computer network, an eligibility restriction on one or more subsequent networked group activities.

14. The non-transitory computer-readable medium of claim 11, wherein at least one of the first, second, third, and new participants is assigned a participant title explicitly characterizing a measure of at least one participant as being a facilitator or hinderer of balance in the computer game.

15. The non-transitory computer-readable medium of claim 11, wherein the operation further comprises:

upon determining that a given participant, selected from the first and second participants, has surpassed a threshold number of times of becoming unavailable during networked group activities, assigning, as a penalty to the given participant via the computer network, an eligibility restriction on one or more subsequent networked group activities, wherein the eligibility restriction is removed only upon completion of a predefined count of the one or more subsequent networked group activities.

16. A system of using balancing actions to mitigate disruption of networked group activities as a result of participant inactivity, the system comprising:

one or more computer processors;

a memory containing the application which, when executed by the one or more computer processors, performs an operation comprising:

programmatically conducting a plurality of networked group activities in a virtual environment of a computer game, based on input received from a plurality of participants via a computer network, wherein each networked group activity includes two teams of avatars controlled based on the input, each team having a respective plurality of distinct avatars, each avatar of which is controlled by a respective participant of the plurality of participants, wherein the at least two teams are in competition with one another to achieve a predefined objective when participating in the respective networked group activity, wherein each avatar is selected from a set of available avatars, each available avatar having a distinct name and a distinct gameplay aspect relative to other available avatars;

upon determining, during a first of the plurality of networked group activities, that the avatar of a first of the plurality of participants is inactive in the first networked group activity as characterized by absence of gameplay input received from the first participant for at least a threshold period of time while the avatar of the first participant remains present in the first networked group activity, performing a first balancing action including replacing the first participant with a new participant, outside of the plurality of players, in the first networked group activity for at least part of a duration in which the avatar of the first player is inactive;

upon determining, during a second of the plurality of networked group activities, that the avatar of a second of the plurality of participants is inactive in the second networked group activity, performing a second balancing action including prohibiting activity of the avatar of a third participant of the plurality of participants and on an opposing team relative to the second participant, in the second networked group activity for at least part of a duration in which the avatar of the second participant is inactive; and subsequent to completion of at least one of the first and second networked group activities, awarding an incentive via the computer network and to at least one of the new participant and the third participant for facilitating balance in the computer game.

17. The system of claim 16, wherein the first balancing action further includes assigning the new participant an inherited gameplay measure via the computer network.

18. The system of claim 16, wherein the operation further comprises:

upon determining that a given participant, selected from the first and second participants, has exhibited a pattern of becoming unavailable during networked group activities, assigning, as a penalty to the given participant via the computer network, an eligibility restriction on one or more subsequent networked group activities.

19. The system of claim 16, wherein at least one of the first, second, third, and new participants is assigned a participant title explicitly characterizing a measure of at least one participant as being a facilitator or hinderer of balance in the computer game.

20. The system of claim 16, wherein the operation further comprises:
   upon determining that a given participant, selected from the first and second participants, has surpassed a threshold number of times of becoming unavailable during networked group activities, assigning, as a penalty to the given participant via the computer network, an eligibility restriction on one or more subsequent networked group activities, wherein the eligibility restriction is removed only upon completion of a predefined count of the one or more subsequent networked group activities.

* * * * *